(12) United States Patent
Pieper et al.

(10) Patent No.: US 12,338,107 B2
(45) Date of Patent: Jun. 24, 2025

(54) WHEEL BLOCK, IN PARTICULAR FOR A TRAVELLING CRANE

(71) Applicant: Konecranes Global Corporation, Hyvinkää (FI)

(72) Inventors: Lukas Pieper, Bochum (DE); Moritz Sagurna, Bochum (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 18/703,977

(22) PCT Filed: Oct. 26, 2022

(86) PCT No.: PCT/EP2022/079876
§ 371 (c)(1),
(2) Date: Apr. 23, 2024

(87) PCT Pub. No.: WO2023/072987
PCT Pub. Date: May 4, 2023

(65) Prior Publication Data
US 2024/0327172 A1     Oct. 3, 2024

(30) Foreign Application Priority Data

Oct. 28, 2021   (DE) ............... 10 2021 128 150.4

(51) Int. Cl.
| | |
|---|---|
| *B61C 9/08* | (2006.01) |
| *B60B 17/00* | (2006.01) |
| *B61K 9/12* | (2006.01) |
| *B66C 9/08* | (2006.01) |
| *G01M 17/013* | (2006.01) |
| *G01M 17/10* | (2006.01) |
| *B66C 13/16* | (2006.01) |
| *B66C 15/06* | (2006.01) |

(52) U.S. Cl.
CPC ............. *B66C 9/08* (2013.01); *B60B 17/00* (2013.01); *B61K 9/12* (2013.01); *G01M 17/013* (2013.01);
(Continued)

(58) Field of Classification Search
CPC .. B66C 9/08; B66C 9/16; B66C 17/00; B66C 13/16; B66C 15/065; B66C 13/46;
(Continued)

(56) References Cited

U.S. PATENT DOCUMENTS 7,766,551 B2 * 8/2010 Jansen ................. B66C 9/08
384/549
9,248,844 B2 * 2/2016 Schlierbach-Knobloch ...............
E01B 25/00
(Continued)

FOREIGN PATENT DOCUMENTS

CN      112027915 A  * 12/2020 ............. B66C 13/16
CN      112 816 229 A      5/2021
(Continued)

*Primary Examiner* — Zachary L Kuhfuss
(74) *Attorney, Agent, or Firm* — Gardner, Linn, Burkhart & Ondersma LLP (57) ABSTRACT

A wheel block, preferably for an overhead traveling crane, wherein the wheel block comprises a housing and a wheel mounted in the housing and protruding out of the housing. In order to allow for proactive maintenance of the wheel with a simple checking process and simultaneously reliable loading and, in particular, overloading detection and identification, according to the invention, the wheel block has a contactless operating measuring device for determining the distance between the measuring device and the wheel, in order to detect and/or identify and/or predict any current and/or future wear on the wheel and/or a loading, in particular an unloaded state and/or an overloaded state, of the wheel block based on measurement signals or measurement data from the measuring device and an evaluation thereof.

20 Claims, 5 Drawing Sheets

(52) U.S. Cl.
CPC ............. *G01M 17/10* (2013.01); *B66C 13/16* (2013.01); *B66C 15/065* (2013.01)

(58) Field of Classification Search
CPC ..... B66C 13/00; G01M 17/10; G01M 17/013; B61K 9/12; B60B 17/00; G01B 11/08; B60C 11/246
USPC ..................................................... 105/163.1
See application file for complete search history.

(56) References Cited

U.S. PATENT DOCUMENTS

| | | | |
|---|---|---|---|
| 2016/0041028 A1* | 2/2016 | Hammerl | G01G 19/086 701/50 |
| 2023/0041995 A1* | 2/2023 | Kanakasabai | B66F 17/00 |

FOREIGN PATENT DOCUMENTS

| | | | | |
|---|---|---|---|---|
| CN | 112985846 A | * | 6/2021 | ........... B60C 11/246 |
| CN | 115611164 A | * | 1/2023 | |
| DE | 31 34 750 C2 | | 11/1983 | |
| DE | 19540217 C1 | * | 1/1997 | ............... B66C 9/08 |
| DE | 19540220 C2 | * | 4/2001 | ............... B66C 9/08 |
| DE | 10 2004 008 552 B3 | | 7/2005 | |
| DE | 102019114288 A1 | * | 12/2020 | |
| DE | 102019210884 A1 | | 1/2021 | |
| DE | 102021128278 A1 | * | 5/2023 | ............... B61K 9/12 |
| JP | 2017146227 A | * | 8/2017 | |
| WO | WO-9714645 A2 | * | 4/1997 | ............... B66C 9/08 |

\* cited by examiner

WHEEL BLOCK, IN PARTICULAR FOR A TRAVELLING CRANE

The invention relates to a wheel block according to the preamble of claim 1.

Such a wheel block is known, for example, from DE 10 2004 008 552 B3, DE 19 540 217 01 or DE 31 34 750 02.

As a result of wear on the wheel of such a wheel block, which is installed, for example, on an overhead traveling crane carriage support, defects and possibly a resulting accident can arise. In order to avoid this, a timely replacement of the worn wheel is required. One possibility for inspecting the wear is for the wheel block to be dismantled and disassembled into its components. The wheel can subsequently be examined for wear. Alternatively, the wear can be examined by means of markings by initially marking the contact point of the wheel on the rail on both parts. Subsequently, one revolution of the wheel is used to apply a further marking on the rail and to measure the distance between the markings. This then allows deriving the wheel circumference and diameter and thus the potential wear.

An overhead traveling crane having a system for detecting wear on the running wheels thereof is known from JP 2017 146 227 A. The system comprises two laser distance meters, reflectors and a controller. A disadvantage of such a solution is a comparatively high cost and operating effort and a comparatively low robustness of the system against mechanical influences, such as vibrations.

Systems for detecting wear on traveling crane wheels are known from CN 112 816 229 A and CN 112 985 846 A, wherein the respective running wheel is not mounted in a housing of a wheel block and is therefore not enclosed.

Based on this prior art, the present invention is based on the object of enabling proactive maintenance for a wheel block of the same type with a simple checking process and simultaneously reliable loading and, in particular, overloading detection and identification.

This object is achieved by a wheel block having the features of claim 1. Advantageous embodiments of the invention are specified in the dependent claims and the following description.

According to the invention, with a wheel block that comprises a housing and a wheel mounted in the housing and protruding from the housing, predictive maintenance with a simple checking process and simultaneously reliable loading and, in particular, overloading detection and identification, are made possible by the fact that the wheel block has a contactlessly operating measuring device for determining the distance between the measuring device and the wheel, in order to detect and/or identify and/or predict any current and/or future wear on the wheel and/or a loading, in particular an unloaded state or an overloaded state, of the wheel block based on measurement signals or measurement data from the measuring device and an evaluation thereof.

The measuring device is preferably installed in the housing. The wheel block and in particular its wheel can be driven by a drive unit, in particular with an electric motor. The wheel block according to the invention can optionally be used for a crane, in particular for an overhead traveling crane, for example a bridge crane or gantry crane, which is typically displaceable bound to a rail, wherein the wheel of the wheel block, as one of a plurality of running wheels of the crane, is in contact with the rail and rolls along it.

The wheel mounted in the housing is rotatable about an axis of rotation that is horizontally aligned in the usual installation position of the wheel. The K, wheel is preferably mounted by means of a hub which is held laterally in each case in a sliding bearing and/or roller bearing which is inserted in the housing.

By means of the measuring device mounted on or in the housing and thus integrated and permanently present in the housing or wheel block, the wear or loading on the wheel is detectable and/or identifiable in the installed state of the wheel. For this purpose, in each case, the distance between the measuring device and the wheel, in particular its running surface, is measured, and conclusions about the shape and/or diameter of the wheel and thus current or future wear and/or the loading are drawn from this or from changes to it. The running surface is arranged on the circumference of the wheel and is used in particular for contact between the wheel and a rail. The running surface can also be bounded by a flange, in particular on both sides. When the wheel is moved, wear occurs on the running surface due to abrasion, which leads to measurable changes in shape and/or diameter and consequently to deteriorated running behavior and even wheel failure.

The measuring device can therefore be used not only to identify or predict the current or future wear of the wheel, but also to identify the loading on the wheel block and, in particular, to detect any overloading. In other words, the measuring device can be used as a load sensor. Neither dismantling of the wheel block, in particular removal of the wheel, nor a separate measuring instrument separate from the wheel block are necessary for this purpose.

In the context of the invention, "detection" or "detectable" means that it is possible to identify that wear or an overloaded state of the wheel is present. In the context of the invention, "identification" or "identifiable" means that the wear of the wheel or the loading in the overloaded state of the wheel block is quantifiable and thus can be numbered.

Calibration is required to use the measuring device as a load sensor. For this purpose, the distance is measured in an unloaded state with a first measurement and optionally stored in a memory unit. The measurement shows the current distance without force at such point in time. It serves as a reference value for the deviation under load. During such measurement, it is advantageous if the wheel block is in motion, for example if the wheel is rolling on a rail, in order to obtain a value that is as accurate as possible.

Subsequently, one or more measurements can be carried out under load to identify the load and optionally define a limit value for this, which allows overload protection to be implemented. The wheel block can be regarded as a spring-damper system that deflects in proportion to the weight force or the load applied by the respective loading. Depending on the loading, the distance from the measuring device to the wheel is reduced. The difference between the first measurement in the unloaded state and the second or the respective further measurement under load is the basis for the weight calculation. The relationship between the deflection or change in the measurable distances and the weight force or loading was obtained empirically from tests. At this point, the calculated deflection is compared with the empirical data. The operator can then call up the loading and, in particular, the corresponding weight as information or have it visualized on a display described in more detail below. Due to the required calculation of the value, such application is particularly advantageous in the context of the online evaluation described in more detail below.

A desired limit value can also be defined and saved, which in particular enables simple detection of an overloaded state without quantifying the current loading. This means that an overloaded state can also be output as information in the offline evaluation described in more detail below, for example by means of an LED lamp or another simple light source that indicates the overloaded state as a warning light.

The measurements, storage and evaluation of the measurement signals or measurement data from the measuring device, in particular by incorporating the memory unit and/or evaluation unit described below, can be computer-aided in particular. Therefore, the measuring device can also carry out its measurements at a predeterminable and, in particular, adjustable frequency discontinuously, for example spread over a plurality of days, or continuously. The same applies to the evaluation of the measurement signals or measurement data.

In an advantageous way, the measuring device can be connected by means of an insulated and in particular shielded cable, which in turn can then be part of the signal-transmitting connection with the memory unit and/or evaluation unit. For this purpose, the cable is guided inside the housing via a guide, which can be part of the fastening device described in more detail below for the measuring device, to an outer wall bore in the housing and out of the housing through said bore. The measurement signals or measurement data can be read out at the predetermined frequency via the cable and made available for evaluation in the evaluation unit or previously for intermediate storage in the memory unit.

In contrast to contact-based measuring devices with mechanical sensors, measurement inaccuracies due to sensor wear can be avoided by the contactlessly operating measuring device according to the invention, which enables a more reliable measurement. A further advantage is that the measurement or distance determination and the evaluation based on it, in particular testing of the wheel with regard to its state (loading and/or wear), can be carried out at a distance without dismantling and without a fitter and in particular from outside the wheel block.

In a particularly advantageous manner, the measuring device comprises an inductive distance sensor, preferably an analog inductive distance sensor. Such a distance sensor is characterized by the fact that, compared to other non-contact distance sensors, its functionality is not impaired by increased dust formation or the formation of deposits (for example, caused by chips, particles or abrasion), which is unavoidable in industrial applications in particular. Another advantage over other non-contact distance sensors is that an inductive distance sensor is less expensive to procure.

In a structurally simple manner, the measuring device is arranged between an inner wall of the housing and the wheel and is attached to the inner wall and is preferably positioned in such a way that, in the installation position of the wheel block, it is located above or above and to the side of the axis of rotation of the wheel. Due to material deposits that can occur in the housing and on the measuring device, in particular during operation, incorrect measurement results could otherwise occur. Preferably, the measuring device is also arranged such that it is at the lower end of its measuring range, wherein this defines the distance between the measuring device and the wheel, in particular its running surface, when the wear limit is reached, which is dependent on the size of the wheel block and can be between 0 and 5 mm, for example. In other words, the measuring device must be installed in such a way that a distance corresponding to the wear limit of the wheel can still be reliably recorded.

In a further embodiment of the wheel block, it can also be the case that the measuring device is attached to a section of the inner wall by means of a fastening device, preferably comprising an, in particular block-shaped, shaped element and/or a spacer block and/or a fastening strut, preferably in the form of a retaining plate. The section of the inner wall used for attachment forms an outer wall of the housing on the rear side or the section of the inner wall is part of a, preferably symmetrical, inner profile of the housing, wherein the inner profile serves as a stiffening element and/or receptacle for at least one screw connection element and can, for example, have corresponding bores for this purpose. The fastening device itself can also be attached by means of a screw connection.

One embodiment of the wheel block with the measuring device fastened by means of the shaped element is characterized by an advantageously simple fastening, wherein existing receptacles, in particular in the inner profile formed by the inner wall, can be used to produce a screw connection and a material weakening of the outer wall of the housing can be avoided. The shaped element is preferably designed in such a way that it has a contact surface that complements the contour, in particular the curved contour, of the inner profile forming the inner wall, in order to optimize the stability of the fastening and minimize vibrations that impair the accuracy of the distance measurement.

An embodiment of the fastening device that is comparatively easy to manufacture is achieved by the preferably cuboid, spacer block, in particular if this is attached to the section of the inner wall of the housing formed on the rear side of the outer wall, for example above the axis of rotation, where no inner profile as a stiffening element and/or receptacle for a screw connection element is provided. Such a fastening of the measuring device in this way also has the advantage that the spacer block is easy to place in the wheel block or its housing and can be easily adjusted if necessary due to its geometry.

The embodiment of the fastening device, which comprises a fastening strut preferably in the form of a retaining plate, enables simple guidance in a particularly advantageous manner when using a cable as part of the signal-transmitting connection between the measuring device, the memory unit and/or the evaluation unit. Existing receptacle points, for example receptacles in the inner profile of the housing, can be used to fasten the fastening strut in a similar way to the shaped element, and there is no need to rework the housing to optimize a contact surface for a shaped element or a spacer block. Preferably, the ends of the fastening strut are screwed to the housing using the symmetry of the housing and also the inner profile via two opposing receptacles for screw connection elements, as a result of which a symmetrical structure of the fastening strut also arises. The measuring device is fastened to the fastening strut between the two receptacle points or ends of the fastening strut.

Furthermore, it can be the case that the housing has at least one outer connecting surface with at least one bore, via which the housing can be fastened to a connecting structure, preferably a load-bearing structural part of an overhead traveling crane, in particular a carriage support of the overhead traveling crane, wherein the housing preferably comprises two housing shells, which are preferably designed to be symmetrical and identical and can be detachably connected to one another to form the housing, in particular by means of a screw connection.

In particular, the housing of the wheel block can be designed to be box-shaped and open on its underside, wherein the wheel then protrudes through an opening and otherwise is enclosed by the remaining, preferably five, side walls of the housing. The housing can be composed of a plurality of parts in the form of housing shells, preferably of two identical housing halves, as a result of which a correspondingly symmetrical structure of the housing arises.

The housing can then have the connecting surface(s), also referred to as the head connecting surface(s), on a side opposite the underside, which is/are used to connect the wheel block to a carriage support of a crane, for example. In this case, the connecting surface can be brought into abutment on a counter surface by means of a screw or bolt connection in order to produce the corresponding connection, for example on the carriage support or the drive unit. For the screw or bolt connection, corresponding connection bores are provided, into which corresponding screws or bolts engage.

The wheel block according to the invention can also be used particularly advantageously in a system with an evaluation unit and/or a memory unit. The evaluation unit and/or the memory unit can be connected to one another and/or to the measuring device in each case in a signal-transmitting manner in order to store measurement signals or measurement data, in particular as raw signals or raw data, from the measuring device by means of the memory unit and/or to evaluate them by means of the evaluation unit, and to store information identified by the evaluation about the current and/or predicted wear of the wheel, preferably including a calculation of maintenance intervals, and/or about a loading, in particular an unloaded state and/or an overloaded state, of the wheel block by means of the memory unit.

The memory unit can comprise a cloud-based web server and/or a local data carrier, in order to store the measurement signals or measurement data and/or the information identified by evaluating them. The memory unit can also be at least partially part of the evaluation unit.

It is also the case that the evaluation unit and/or the memory unit can be connected to a display in a signal-transmitting manner, in order to display the measurement signals or measurement data and/or the information identified by the evaluation to an operator. The display for visualizing the measurement signals or measurement data and/or information can have a screen and/or at least one light source, preferably at least one LED lamp, for displaying light signals, preferably in different colors.

This allows offline and online evaluation to be realized in an advantageous way.

During online evaluation, the required data is stored on the memory unit, for example a cloud-based web server, which then serves as a backend for the GUI (graphical user interface) of the customer application and is visualized to the respective operator, for example on a smartphone or tablet screen that serves as a display. This enables a temporary connection of the smartphone or tablet or another terminal device, for example a laptop or a PC, with the memory unit and thus a location-independent calling up and/or visualization of the measurement signals or measurement data and/or information. As a result, an operator can perceive the result of the detection and/or identification of the wear and/or loading without having to be present at the wheel block or disassemble it into its components.

Depending on the degree of wear, for example, an expected service life and a date for a service interval for the wheel block are displayed as information regarding the status of the wheel block. In addition, the following three status messages can optionally be displayed: "Wheel is OK," "Wheel needs to be changed soon" and "Wheel is worn."

Similar to the online evaluation, three status messages can also be defined with the offline evaluation and displayed by means of the at least one light source, for example in the form of one or more signal LEDs on the wheel block or its housing. In this embodiment, for example, a green LED light indicates "Wheel is OK," a yellow LED light indicates "Wheel needs to be changed soon" and a red LED light indicates "Wheel is worn." In contrast to online evaluation, offline evaluation is particularly advantageous for displaying the wear status rapidly and easily.

An overhead traveling crane, in particular a bridge crane or a gantry crane, is also advantageously improved by comprising a wheel block according to the invention or a system according to the invention. The advantages described in each case for the overhead traveling crane apply accordingly.

Both in a crane and in other applications, the carriage support can be designed, for example, as a T beam, double-T beam, box beam, L-profile beam or C-profile beam. A plurality of wheel blocks according to the invention can be arranged on a single carriage support. In the case of two wheel blocks, the wheel blocks are arranged one behind the other in particular in a running direction of the running wheels. Of course, it is conceivable that the wheel blocks are also arranged next to one another with respect to the running direction of the running wheels. A combination of both is also possible.

In the case of a crane application, the carriage support can be arranged on a bridge of an overhead traveling crane or on a support of a gantry crane and/or on a crane trolley of the overhead traveling crane or gantry crane. Of course, the wheel block according to the invention and the system according to the invention can also be used on other crane types.

In addition, the advantages according to the invention also have an effect on a method for operating such a system or crane, in particular an overhead traveling crane. Accordingly, the evaluation unit can receive measurement signals or measurement data, in particular as raw signals or raw data, from the measuring device and evaluate them at a defined evaluation frequency, in order to detect and/or identify and/or predict any current and/or future wear on the wheel and/or the loading on the wheel block. Alternatively or additionally, measurement signals or measurement data, in particular as raw signals or raw data, from the measuring device and/or information about the current and/or predicted wear of the wheel identified by their evaluation by means of the evaluation unit, preferably including a calculation of maintenance intervals, and/or about the loading of the wheel block are stored by means of the memory unit.

In a further embodiment, one or more of the following steps are carried out for evaluation:

- Formation of arithmetic mean values of the measurement signals or measurement data, in particular the raw signals or raw data
- Use of mean values for the generation of limit values and/or limit ranges of wear and/or loading
- Use of a filter method, in particular with a high-pass and/or low-pass filter, for generating limit values and/or limit ranges of the wear and/or load
- Use of statistical smoothing methods, in particular the 3-point median method, in order to eliminate extreme values and outliers that occur during operation due to unevenness or electronic measurement signal interference
- Generation of information about the current and/or predicted wear of the wheel, preferably including a calculation of maintenance intervals, and/or about the loading on the wheel block.

In an advantageous way, the maintenance intervals can be determined in a particularly reliable and, in particular, application-specific or customer-specific manner by continuously evaluating the measurement signals or measurement data, since the wear behavior of the wheel under the respective load conditions is stored.

The measurement signals or measurement data and/or the information identified by the evaluation can then be called up by an operator as described above and/or visualized to an operator via the display.

Further details of the invention emerge from the following description of exemplary embodiments with reference to the drawing, in which.

Figure 1:
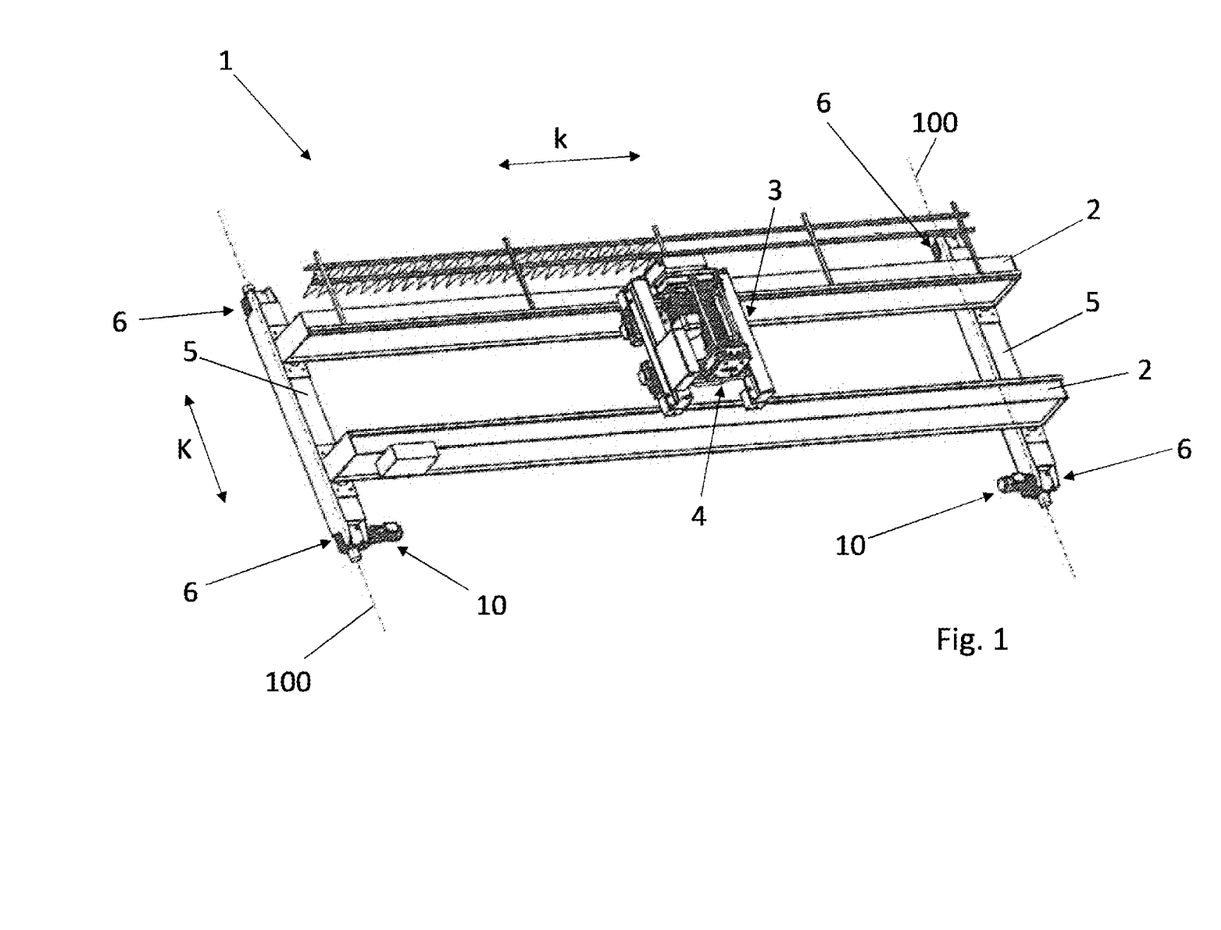
FIG. 1 shows a schematic, perspective view of an overhead traveling crane.

FIG. 1 shows a schematic, perspective view of an overhead traveling crane 1, which is designed here, by way of example, as a so-called double-girder bridge crane. The overhead traveling crane 1 can be moved substantially horizontally in a crane travel direction K on a rail path with two rails 100 (indicated schematically by dot-dashed lines) that are parallel to one another and spaced apart from one another (also referred to as wheel tracks).

The overhead traveling crane 1 comprises two box girders 2 which extend parallel to and at a distance from one another and which, by way of example, form a horizontal crane girder and serve as a travel path for a trolley 3 with a hoist 4. In this context, the trolley 3 moves on the box girders 2 in a horizontal trolley travel direction k which is oriented at right angles to the crane travel direction K. Accordingly, the box girders 2 also extend in the trolley travel direction k. Alternatively, only a single box girder 2 or double-T profile can also be provided in the manner of a single-girder bridge crane. The trolley 3 then moves, for example, on a lower flange of the box girder 2. In order to form the respective crane girder, truss girders can be used instead of box girders 2.

The box girders 2 lie on their respective opposite ends on carriage supports 5 extending transversely thereto, and thus in the crane travel direction K. A wheel block 6 is arranged in each case at the opposite ends of the carriage supports 5, with at least one of the two wheel blocks 6 per carriage support 5 being driven by an electric motor 10. The wheel blocks 6 are in each case movable with their wheel 11 (see FIGS. 2, 3a-b, 4a-b, 5a-b) on the rails 100 in the crane travel direction K. Of course, the wheel blocks 6 can also be used on other crane types as part of their crane carriage.

Figure 2:
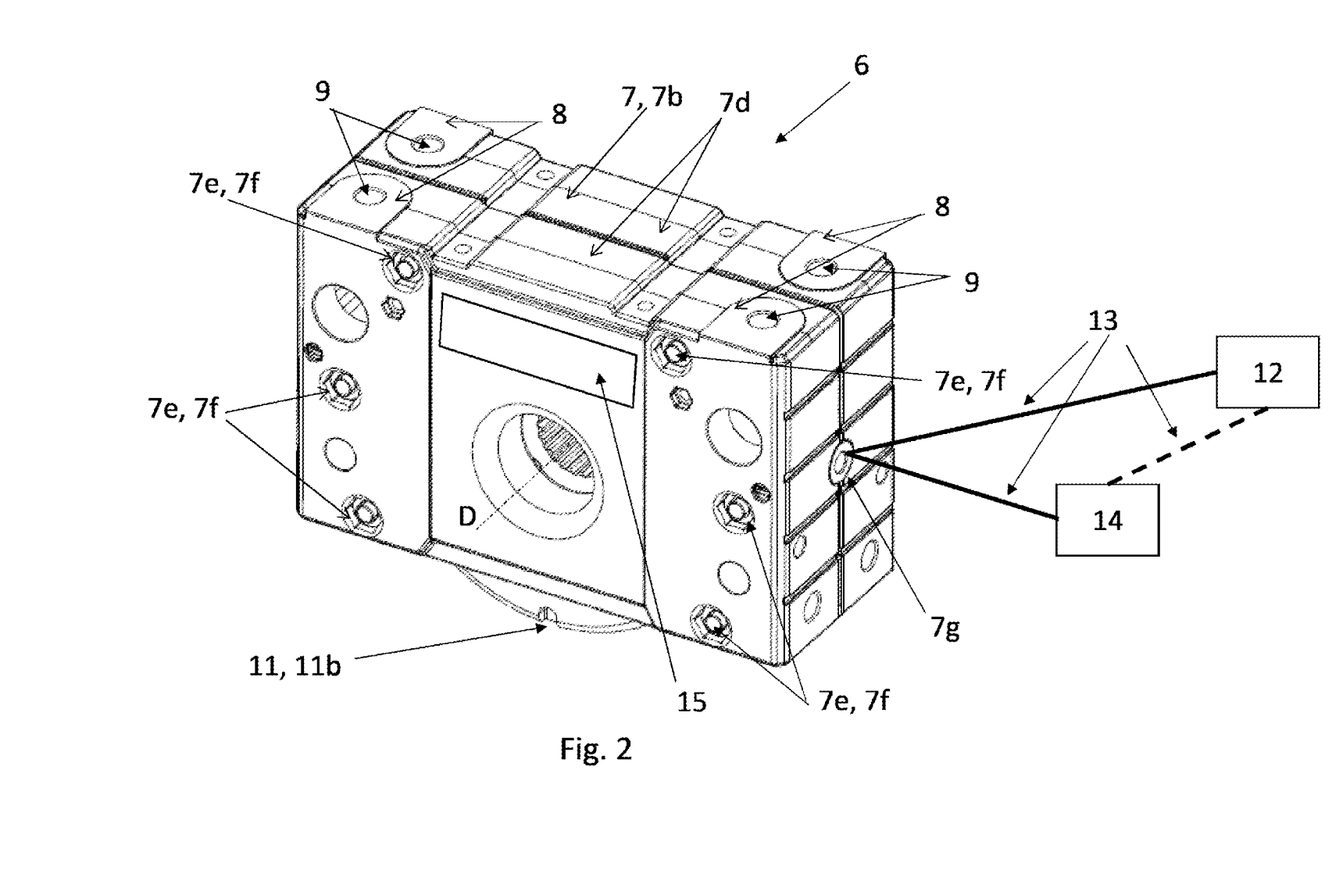
FIG. 2 shows a schematic, perspective view of a wheel block.

FIG. 2 shows a schematic perspective view of a wheel block 6.

The wheel block 6 has an exemplary box-shaped housing 7, which is composed of two identical housing shells 7d and screwed together. Each of the two housing shells 7d is symmetrical and identically constructed. A wheel 11 (see also FIGS. 3a-b, 4a-b, 5a-b) with a running surface 11a formed on its circumference is accommodated in the housing 7 and is rotatably mounted about its axis of rotation D, which is oriented horizontally in the installation position. The running surface 11a is bounded by a flange 11b (see FIGS. 3b, 4b, 5b).

The two housing shells 7d are connected so as to form the housing 7 via a plurality, for example six, screw connections 7e, which are preferably arranged in equal numbers on opposite sides of the axis of rotation D. To form the respective screw connections 7e, a receptacle 7f for a screw connection element is provided in each housing shell 7d, which receptacle preferably runs parallel to the axis of rotation D through both housing shells 7d and can accommodate an associated screw or bolt, for example. The respective receptacle 7f is bounded in the housing 7 by an inner profile 7c, which thus not only serves as a receptacle 7f for screw connection elements such as the aforementioned screws or bolts, but also as a stiffening element.

The housing 7 has an opening 23 on its underside, as a result of which the wheel 11, designed as a running wheel, protrudes from the underside of the housing 7 in the installed position of the wheel and is otherwise enclosed by the other five side walls of the housing 7

The wheel block 6 can be fastened via its housing 7 to a connecting structure, which can be, for example, a carriage support 5 of a crane trolley, in particular of the overhead traveling crane 1. For this purpose, the housing 7 has at least one connecting surface 8, which is arranged on a side opposite the underside, for example, and can then also be referred to as the head connecting surface. Preferably, at least two connecting surfaces 8 lying in one plane are provided for torsion-proof fastening. In the present exemplary embodiment, four connecting surfaces 8 are arranged on the outer wall 7b of the housing 7 opposite the open underside, wherein two connecting surfaces 8 are provided for each housing shell 7d. Each connecting surface 8 has a connection bore 9. When the wheel block 6 is installed on the carriage support 5, the respective connecting surface 8 comes to abut on a counter surface (not shown) on the carriage support 5 in order to be fastened thereto by screws or bolts engaging in the connection bores 9. The connection bores 9 can be provided with a thread for this purpose and designed as a threaded bore accordingly.

Within its housing 7, the wheel block 6 has a measuring device 20 (see FIGS. 3a-3b, 4a-4b, 5a-5b) for determining the distance between the measuring device 20 and the wheel 11, which device is preferably designed as an analog inductive distance sensor. Based on measurement signals or measurement data from the measuring device 20 and an evaluation thereof, any current and/or future wear on the wheel 11 and/or a loading, in particular an unloaded state and/or an overloaded state, of the wheel block 6 can thus be detected and/or identified and/or predicted.

The measuring device 20 is connected to an evaluation unit 12 and memory unit 14 in a signal-transmitting manner, in the present exemplary embodiment by means of an insulated and shielded cable 13. For this purpose, the cable 13 is guided inside the housing 7 via a guide to an outer wall bore 7g in the housing 7 and out of the housing 7 through said bore. The guide for the cable 13 arranged in the housing 7 for establishing the signal-transmitting connection between the measuring device 20 and the evaluation unit 12 and/or memory unit 14 can be part of a fastening device 21 (see FIGS. 3a-b, 4a-b and 5a-b) for the measuring device 20; this applies irrespective of the specific embodiment of the fastening device 21.

The measuring device 20 is attached to the inner wall 7a of the housing 7 by means of the fastening device 21. The measuring device 20 is arranged at a distance from the wheel 11 and mounted in the housing 7 in such a way that the distance from the measuring device 20 to the wheel 11, in particular to its running surface 11a, can still be measured even when the wear limit of the wheel 11 is reached.

The measurement signals or measurement data recorded by means of the measuring device 20 are transmitted via the cable 13 to the evaluation unit 12 and the memory unit 14 for evaluation and storage. A further signal-transmitting connection exists between the evaluation unit 12, the memory unit 14 and a display 15. The display 15 is used to display the measurement signals or measurement data and/or the information identified by the evaluation and can have a screen and/or light sources such as one or more LED lamps for visualization. The signal-transmitting connection for the display 15 can also be established via a cable 13 or wirelessly as well.

FIGS. 3a-b, 4a-b and 5a-b show by way of example three alternative embodiments for the fastening device 21 and correspondingly the attachment and arrangement of the measuring device 20 in the housing 7. The statements on the housing 7 apply accordingly to all embodiments of the fastening device 21.

Figure 3A:
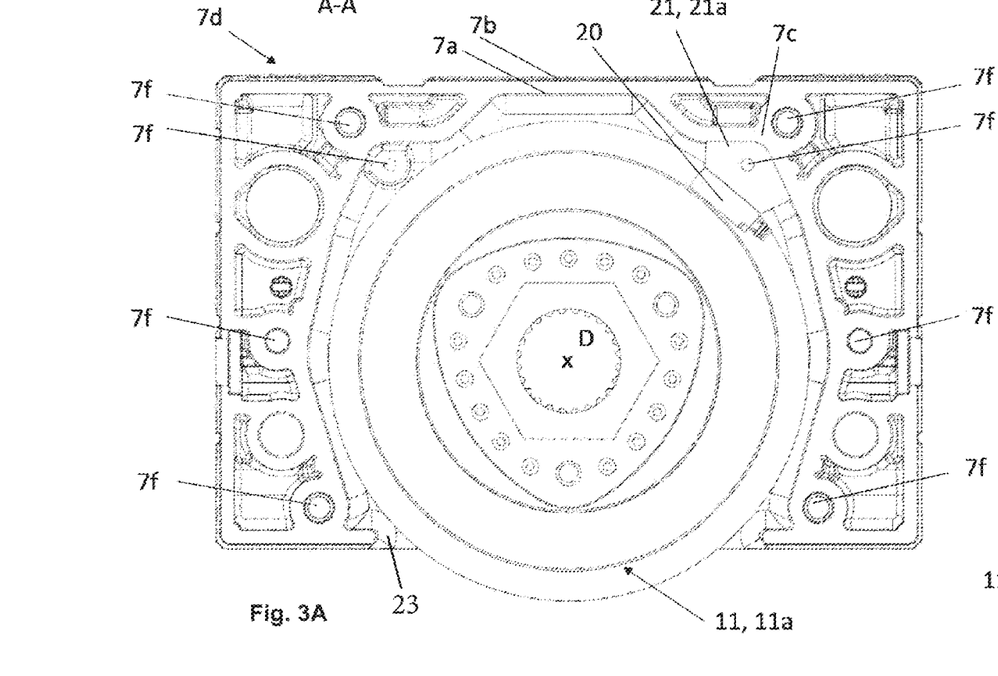
FIGS. 3a and 3b show a cross-section of the wheel block with a measuring device fastened by means of a fastening device with a shaped element.
Figure 3B:
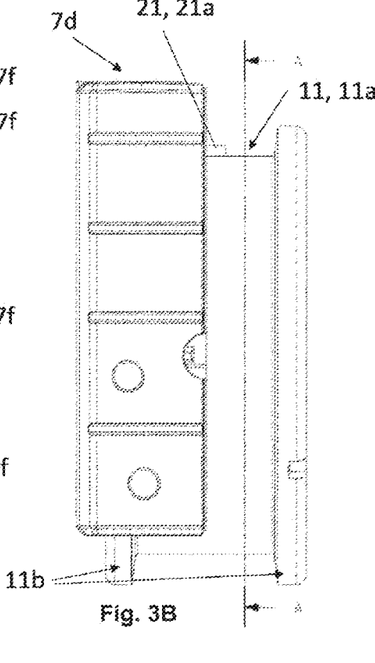

FIGS. 3a-b show a cross-section through the wheel block 6, wherein the fastening device 21 according to this first embodiment comprises a block-shaped element 21, via which the measuring device 20 is attached to the inner wall 7a. The section of the inner wall 7a used for attachment is part of the inner profile 7c of the housing 7, which serves as a stiffening element and also has at least one receptacle 7f for a screw connection element. The fastening device 21 or its shaped element 21 is attached to it by means of a screw connection.

The measuring device 20 is thus arranged between the inner wall 7a of the housing 7 and the wheel 11 in such a way that it is located to the side of and above the axis of rotation D of the wheel 11 and is thus arranged between the axis of rotation D and a corner of the housing 7 and, in particular, approximately on an imaginary direct connection between the axis of rotation D and the corner. The inner profile 7c of the housing 7 and also the section of the inner wall 7a used for attachment, which here is part of the inner profile 7c and serves as a stiffening element and forms receptacles 7f for screw connection elements, are also present in the same way in all other housings 7, irrespective of the embodiment of the fastening device 21 used.

Figure 4A:
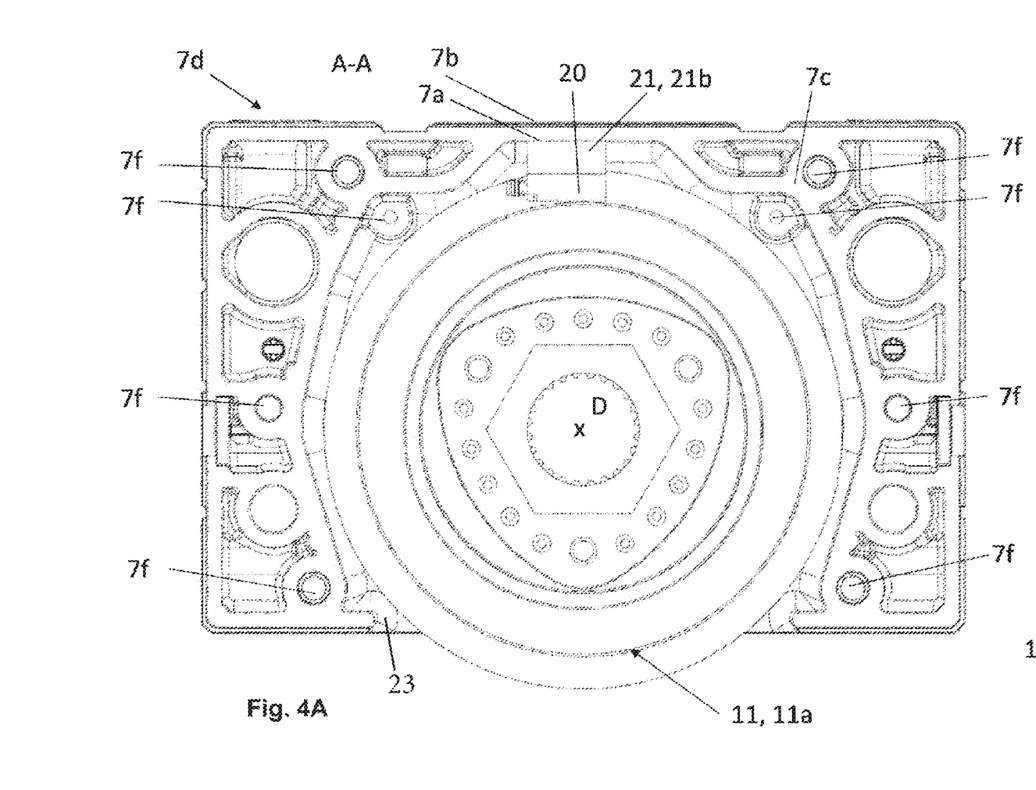
FIGS. 4a and 4b show a cross-section through the wheel block with a measuring device fastened by means of a fastening device with a spacer block and FIGS. 5a and 5b show a cross-section through the wheel block with a measuring device fastened by means of a fastening device with a retaining plate.
Figure 4B:
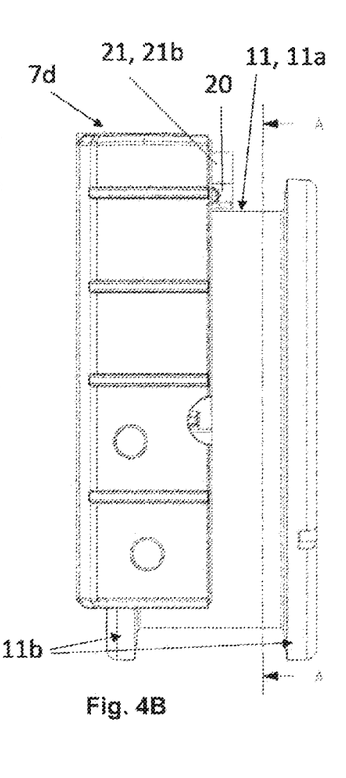

FIGS. 4a-b show a cross-section through the wheel block 6, wherein the fastening device 21 according to this second embodiment comprises a spacer block 21b, via which the measuring device 20 is attached to the inner wall 7a. In the section used for attaching the fastening device 21, the inner wall 7a forms an outer wall 7b of the housing 7b on the rear side. The fastening device 21 is arranged approximately centrally below the upper side of the housing 7, as a result of which the measuring device 20 is arranged above the axis of rotation D of the wheel 11 between the section of the inner wall 7a of the housing 7 used for attachment and the wheel 11. The fastening device 21 itself can be attached to the inner wall 7a of the housing 7 by means of a screw connection.

Figure 5A:
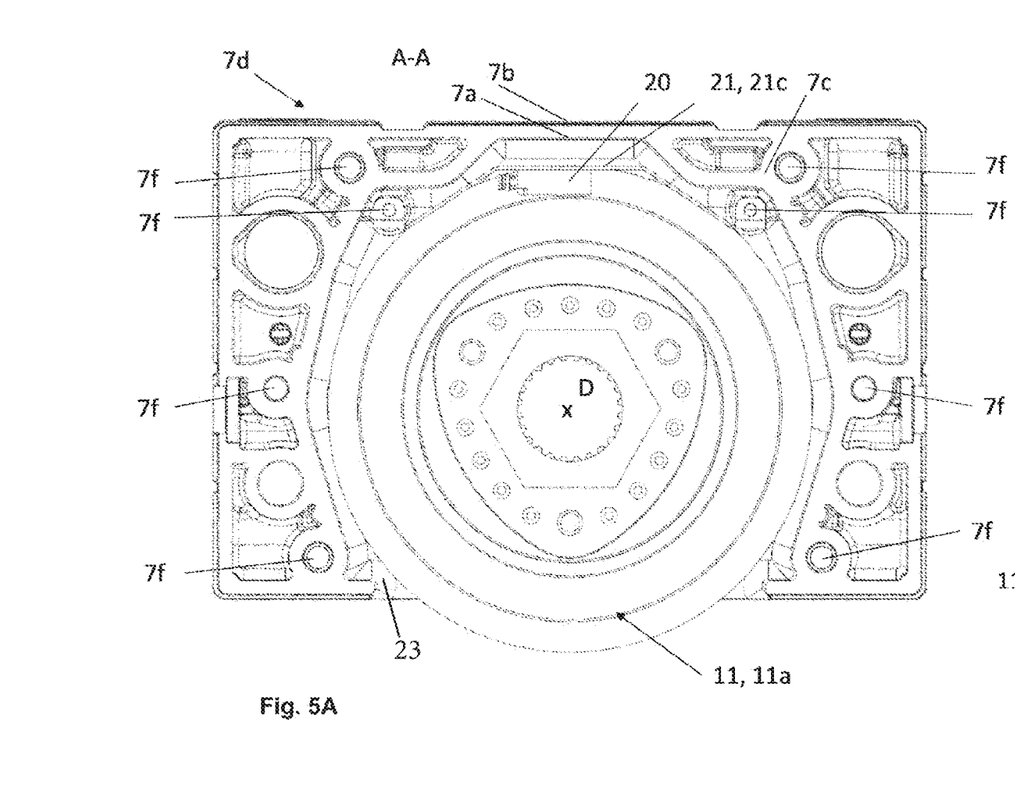
Figure 5B:
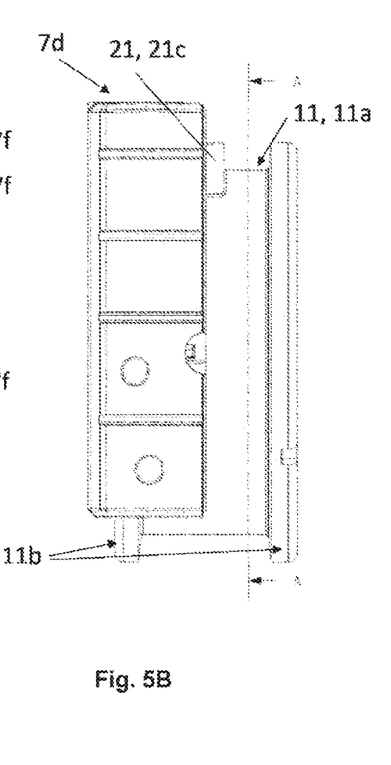

FIGS. 5a-b show a cross-section through the wheel block 6, wherein the fastening device 21 according to this third embodiment comprises a retaining plate 21c serving as a fastening strut, via which the measuring device 20 is attached to the inner wall 7a. The sections of the inner wall 7a used for attachment are part of the inner profile 7c of the housing 7, which serves as a stiffening element and also has a plurality of receptacles 7f, in each case for a screw connection element. This embodiment is characterized by the fact that, similar to the first embodiment, the fastening device 21 can be attached to the inner wall 7a or to the inner profile 7c via existing receptacle points in the form of receptacles 7f. As a result, the measuring device 20 is fastened to the inner wall 7a of the housing 7 centrally between the two receptacle points or receptacles 7f and above the wheel 11 and its axis of rotation D.

In addition, the statements on FIGS. 1 and 2 also apply analogously to FIGS. 3a-b, 4a-b and 5a-b.

The invention claimed is:

1. A wheel block for an overhead traveling crane, wherein the wheel block comprises:
    a housing and a wheel mounted in the housing, wherein the housing comprises a wall disposed about and surrounding an upper portion of the wheel, wherein the wall comprises an inner wall defining an internal cavity within which the wheel is mounted, and wherein the housing includes a lower opening from which a lower portion of the wheel protrudes out of the housing; and
    a contactlessly operating measuring device mounted within the cavity for determining the distance between the measuring device and the wheel; in order to detect and/or identify and/or predict any current and/or future wear on the wheel and/or a loading state of the wheel of the wheel block based on measurement signals or measurement data from the measuring device and an evaluation thereof, wherein the loading state of the wheel may comprise either an unloaded state and/or an overloaded state.

2. The wheel block according to claim 1, wherein the measuring device comprises an inductive distance sensor.

3. The wheel block according to claim 2, wherein the measuring device comprises an analogue inductive distance sensor.

4. The wheel block according to claim 1, wherein the measuring device is arranged between the inner wall of the housing and the wheel and is attached to the inner wall.

5. The wheel block according to claim 4, wherein the measuring device is attached to a section of the inner wall by means of a fastening device comprising at least one of a block-shaped element, a spacer block, a fastening strut, and a retaining plate.

6. An overhead traveling crane having the wheel block according to claim 4, wherein the overhead traveling crane comprises a bridge crane or a gantry crane.

7. The wheel block according to claim 4, wherein the measuring device is positioned in such a way that, in the installation position of the wheel block, the measuring device is located above or above and to the side of an axis of rotation of the wheel.

8. The wheel block according to claim 4, wherein the measuring device is positioned in such a way that, in the installation position of the wheel block, the measuring device is at the lower end of a measuring range of the measuring device.

9. The wheel block according to claim 4, wherein the measuring device is attached to a section of the inner wall, wherein the section of the inner wall used for attachment (i) forms an outer wall of the housing on the rear side, or (ii) is part of an inner profile of the housing that serves as a stiffening element and/or receptacle for a screw connection element.

10. The wheel block according to claim 1, wherein the housing has at least one outer connecting surface with at least one bore, via which the housing is fastened to a structural part of an overhead traveling crane.

11. An overhead traveling crane with the wheel block according to claim 1 wherein the measuring device is configured to output measurement signals or measurement data and is connected to an evaluation unit and/or a memory unit, wherein the evaluation unit and/or the memory unit are connected to one another and/or to the measuring device in each case in a signal-transmitting manner;
   wherein the memory unit is configured to store the measurement signals or measurement data from the measuring device and/or store output data from the evaluation unit; and
   wherein the evaluation unit is configured to evaluate the measurement signals or measurement data from the measuring device and provide the output data based thereon, and wherein the output data comprises information identified by the evaluation unit about the current and/or predicted wear of the wheel, and/or about the loading state of the wheel.

12. The system according to claim 11, wherein the memory unit comprises a cloud-based web server and/or a local data carrier to for storing the measurement signals or measurement data from the measuring device and/or the output data from the evaluation unit.

13. The system according to claim 11, wherein the evaluation unit and/or the memory unit are configured to be connected to a display in a signal-transmitting manner in order to display to an operator the measurement signals or measurement data from the measuring device and/or the output data from the evaluation unit, wherein the display comprises a screen and/or or a light source for displaying light signals.

14. A method for operating the overhead traveling crane according to claim 11 comprising:
   receiving by the evaluation unit measurement signals or measurement data from the measuring device and evaluating the measurement signals or measurement data with the evaluation unit at a defined evaluation frequency in order to detect and/or identify and/or predict (i) any current and/or future wear on the wheel, and/or (ii) the loading state on the wheel block; and/or
   storing by the memory unit measurement signals or measurement data from the measuring device and/or output data from the evaluation unit.

15. The method according to claim 14, wherein said evaluating the measurement signals or measurement data with the evaluation unit comprises one or more of the following steps:
   forming arithmetic mean values of the measurement signals or measurement data;
   generating limit values and/or limit ranges of wear and/or loading;
   generating limit values and/or limit ranges of the wear and/or load using a filter comprising a high pass filter and/or a low pass filter;
   applying statistical smoothing methods in order to eliminate extreme values and outliers that occur during operation due to unevenness or electronic measurement signal interference;
   generating information about the current and/or predicted wear of the wheel and/or about the loading on the wheel block; and
   calculating maintenance intervals.

16. The method according to claim 15, wherein the measurement signals or measurement data and/or the output data from the evaluation unit are accessible up by an operator via the display.

17. An overhead traveling crane, having the wheel block according to claim 1, wherein the overhead traveling crane comprises a bridge crane or a gantry crane.

18. An overhead traveling crane comprising a bridge crane or a gantry crane and comprising the wheel block according to claim 1;
   wherein the measuring device is configured to output measurement signals or measurement data and is connected to an evaluation unit and/or a memory unit, wherein the evaluation unit and/or the memory unit are connected to one another and/or to the measuring device in each case in a signal-transmitting manner;
   wherein the memory unit is configured to store the measurement signals or measurement data as raw signals or raw data from the measuring device and/or store output data from the evaluation unit; and
   wherein the evaluation unit is configured to evaluate the measurement signals or measurement data from the measuring device and provide the output data based thereon, and wherein the output data comprises information identified by the evaluation unit about the current and/or predicted wear of the wheel and/or about the loading state of the wheel.

19. The overhead traveling crane according to claim 18, wherein the output data comprises a calculation of maintenance intervals and/or about an unloaded state and/or an overloaded state of the wheel.

20. The wheel block according to claim 1, wherein the housing comprises two housing shells that are detachably connected to one another to form the housing.

* * * * *

UNITED STATES PATENT AND TRADEMARK OFFICE
CERTIFICATE OF CORRECTION

PATENT NO. : 12,338,107 B2  
APPLICATION NO. : 18/703977  
DATED : June 24, 2025  
INVENTOR(S) : Pieper et al.

Page 1 of 1

It is certified that error appears in the above-identified patent and that said Letters Patent is hereby corrected as shown below:

In the Specification

Column 1  
Line 7, "DE 10 2004 008 552 B3, DE 19 540 217 01 or DE 31 34 750 02" should be --DE 10 2004 008 552 83, DE 19 540 217 C1 or DE 31 34 750 C2--  
Line 67, "the K, wheel" should be --the wheel--

Column 4  
Line 24, "by the preferably" should be --by the, preferably--

Column 8  
Line 21, insert --.-- after "housing 7"

In the Claims

Column 10  
Claim 1, Line 23, delete ";" after "wheel"

Column 11  
Claim 12, Line 21, delete "to" after "carrier"

Column 12  
Claim 17, Line 18, delete "," after "crane"

Signed and Sealed this  
Twenty-fifth Day of November, 2025

John A. Squires  
*Director of the United States Patent and Trademark Office*